United States Patent [19]

Ragnegard

[11] Patent Number: 4,695,381

[45] Date of Patent: Sep. 22, 1987

[54] FILTER FOR CONTINUOUS FILTERING OF A SUSPENSION UNDER PRESSURE

[75] Inventor: Samuel Ragnegard, Hedemora, Sweden

[73] Assignee: AB Hedemora Verkstader, Hedemora, Sweden

[21] Appl. No.: 858,769

[22] Filed: May 2, 1986

[30] Foreign Application Priority Data

May 2, 1985 [SE] Sweden ................................ 8502122

[51] Int. Cl.⁴ .............................................. B01D 33/08
[52] U.S. Cl. ..................................... 210/403; 210/404
[58] Field of Search .............. 210/402, 403, 404, 232, 210/784; 162/323, 330, 331, 335, 357; 209/288, 293, 296, 297

[56] References Cited

U.S. PATENT DOCUMENTS 4,328,099 5/1982 Krappmann et al. ................ 210/232

FOREIGN PATENT DOCUMENTS 701374 1/1931 France .

Primary Examiner—Frank Sever
Attorney, Agent, or Firm—Pollock, Vande Sande & Priddy

[57] ABSTRACT

A filter for continuous filtering of suspension under pressure includes a pressure vessel, a shaft rotatably journalled in the pressure vessell and disc filters elements arranged on the shaft. The filter elements are composed of sectors and inlet filtrate channels in each sector are connected to axially extending channels in the shaft, one axial channel for each sector. The axial channels are connected to a filtrate valve formed to divide the filtering cycle corresponding to one rotation revolution for the filter elements in a number of filtering zones, at least one in liquid phase and one in gaseous phase. A separate filtrate outlet from the pressure vessel is connected to each filtering zone and means is controlling the difference pressure over the filtering zones independent of each other.

8 Claims, 4 Drawing Figures

FILTER FOR CONTINUOUS FILTERING OF A SUSPENSION UNDER PRESSURE

FIELD OF THE INVENTION

The present invention relates to a filter for continuous filtering of a suspension under pressure.

BACKGROUND OF THE INVENTION

Filters for continuous filtering of a suspension are common within e.g. cellulose industry where suspensions have large volume flow and have comparatively high concentration of solid phase. The type of filter, up to now, most commonly existing for this purpose is rotating drum or disc filters which operate with vacuum for establishing required difference pressure over the filter.

Filters of said type have certain obvious disadvantages. In order to establish vacuum it is common, particularly where the hydraulic flow is large, to arrange a so called barometric fallpipe having a vertical length of 6-10 m. This, means that to establish the fallpipe height, the filter must be positioned at such a height, that increasing building and pump costs often result. Alternatively, a vacuum pump can be used; however, the power requirement and thereby the operation costs become high. Another disadvantage when using a vacuum filter is the dependence of the temperature for causing required high vacuum. At higher temperature, the lower vacuum is possible. At temperature over 90° C. it is no longer possible to establish required vacuum and difference pressure. But also at moderate and low temperatures yielding the conditions for a high vacuum, the theoretically maximum pressure can never exceed 100 kPa.

SUMMARY OF THE INVENTION

As distinguished from the above-mentioned vacuum filters, the filter according to the present invention consists of a pressure filter. The present invention makes it possible to establish the required difference pressure over the filter with constructively sinple means which moreover requires small space. The pressure differences over the filter up to 300-400 kPa can be obtained without difficulty. Moreover, there is theoretically no temperature limitation; thus, suspensions at all occurring temperatures can be filtered. A further very essential advantage obtained with a pressure filter according to the present invention is, that, when the filter elements in the filter, upon their rotation run through one revolution, i.e. one filtering cycle, the difference pressures over the filter elements can be controlled independent of each other in the different filtrating zones of the filtering cycle and this with simple means. Advantageously, a rapid building-up of the filter cake on the filter element, for instance at start and interruption, can be guaranteed; and furthermore, an advantageous adaptation of the filtering process to the suspension in question is made possible. In the filtering cycle consisting of liquid phase and gaseous phase, the difference pressure in the liquid phase is preferably lower than that in the gaseous phase.

The characterizing features of the invention for obtaining the above-mentioned advantages are set forth in the appending claims.

BRIEF DESCRIPTION OF THE DRAWINGS

Preferred embodiments of the invention are described more in detail with reference to the accompanying drawings, wherein.

DETAILED DESCRIPTION OF THE INVENTION

Figure 1:
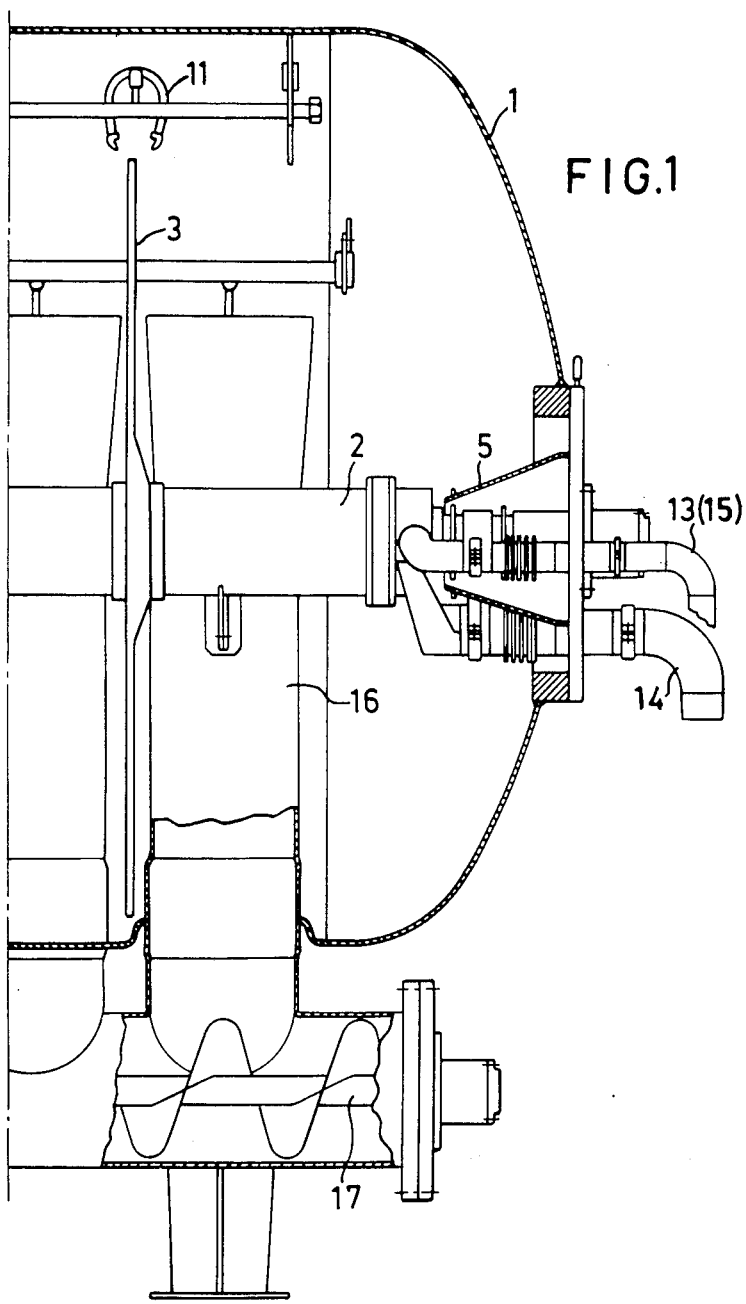
FIG. 1 is a partial side view of a filter according to the invention.
Figure 2:
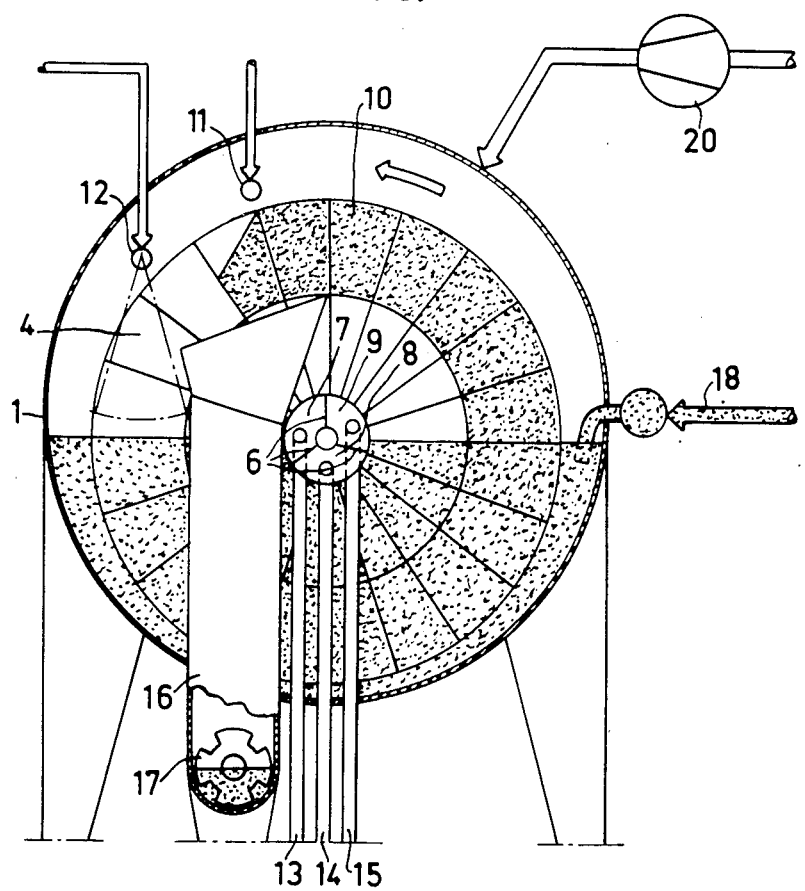
FIG. 2 is an end view schematically illustrating the filter.

The filter shown in FIG. 1 includes a substantially cylindrical pressure vessel 1, in which a shaft 2 provided with a number of filter discs 3 is rotatably journalled. Each filter disc consists of a plurality of disc sectors 4 (see FIG. 2) and the disc sectors can e.g. have the configuration that is shown in U.S. patent application No. 577,913 filed Feb. 7, 1984. As usual, the filter sectors consist of a surrounding filter cloth and interior channels (not shown) which for each filter sector are connected to an axial channel formed in the shaft 2, i.e. a channel for each filter sector, for discharging the filtrate obtained during the filtering operation to filtrate valve 5 arranged at one end of the shaft 2. By means of intermediate walls 6 arranged in the filtrate valve 5 the filtering cycle corresponding to one rotational revolution for the filter discs 3 is divided into a number of filtering zones, which, as for example shown in FIG. 2, are three in number and are designated with the reference numbers 7, 8 and 9. Removal of filter cake 10 obtained during the filtering operation on the filter cloth takes place in the filtering zone 7 by means of a removal device 11, e.g. a spray as shown in U.S. Pat. No. 4,519,910, and in this zone also the initiation stage of the filtering takes place. In the filtering zone 8 filtering in liquid phase takes place. In the filtering zone 9 filtering and drying of the filter cake, possibly also washing of the filter cake, takes place in gaseous phase with air, vapour or another appropriate gas present. As shown, washing of the filter cloth can also take place in the zone 7 by means of some appropriate wash device 12, e.g. a spray. The filtrate valve 5 is provided with a number of filtrate outlets 13, 14 and 15 corresponding to the number of filtering zones. The removed filter cake falls down into a funnel 16 provided with an out-feed screw 17.

Figure 3:
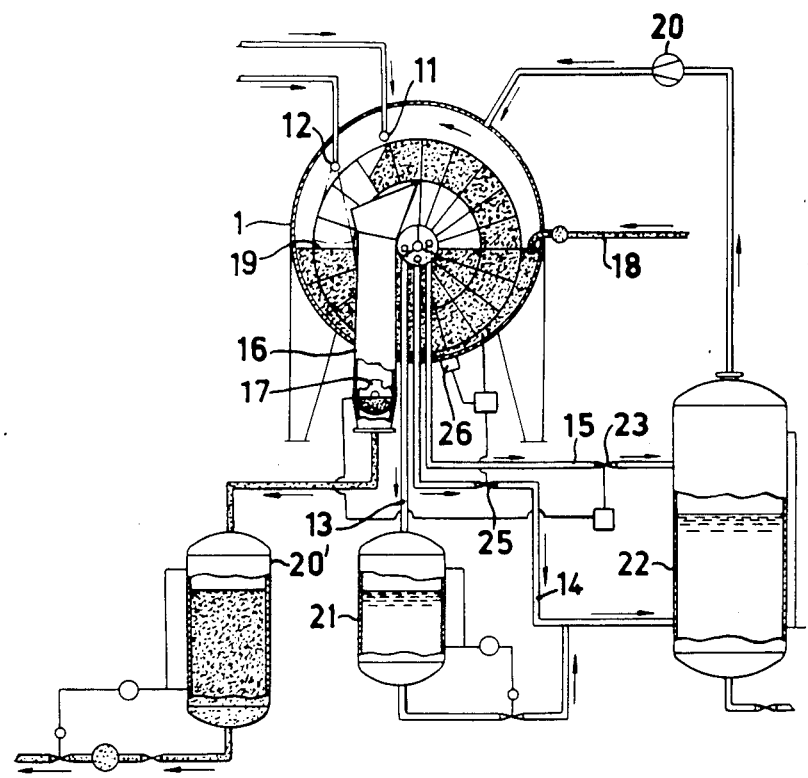
FIG. 3 is a view schematically illustrating the operation of the filter.

FIG. 3 shematically illustrates how the filter opeates. The suspension to be filtered is supplied to the filter 1 via inlet 18 and forms in the filter a level 19. A difference pressure required for a filtering operation in a filter according to the invention is created by means of an appropriate device 20, e.g. a blower. The filter cake removed by means of the device 11 falls down to the outfeed screw 17 and is fed therefrom to an outfeed sluice 20'. The filtrate from the filtering zones 7 is discharged from the pressure vessel 1 via the filtrate outlet 13 to a sluice 21 and further to a filtrate tank 22. The filtrate from the filtering zone 8 is discharged from the pressure vessel 1 via the filtrate outlet 14 to the filtrate tank 22. The filtrate from the filtering zone 9 is discharged from the pressure vessel via the filtrate outlet 15 to the filtrate tank 22 and enters into the tank above the level therein in order to obtain a separation between the filtrate liquid and co-conveyed gas. The gas, which is squeezed through the filter cake 10 in the filtering zone 9 by means of the positive pressure generated by the blower 20 and follows the filtrate into the filtrate outlet 15, is re-circulated from the filtrate tank 22 back to the filter via the blower 20. As best shown in FIG. 2, the lower intermediate walls 6 are inclined downwardly and their outer ends are positioned at a level, below the suspension level 19 for preventing gas from being present in the filter sectors during the filtering in the liquid phase 8.

Figure 4:
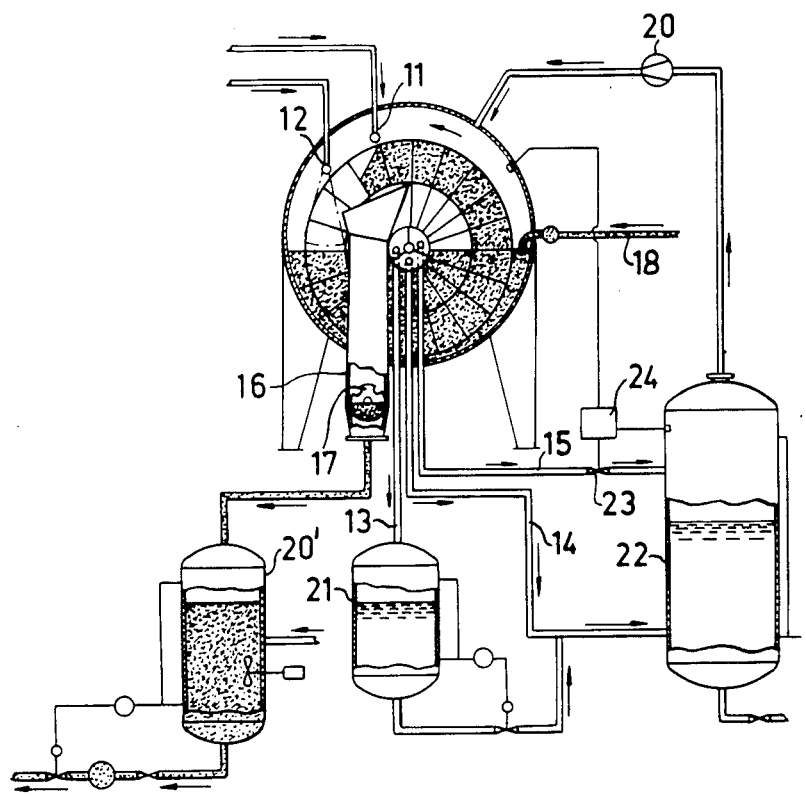
FIG. 4 is a view corresponding to FIG. 3 and illustrating another embodiment of the invention.

For obtaining the difference pressure over the filter required for the filtering operation, some form of restriction in the gas circulation via the blower 20 is required. When the filter operates with a filter cake 10 on the filter elements 4, the filter cake becomes the required restriction. If there is no filter cake or the filter cake is insufficient, e.g. at start of the filtering operation or at interruptions therof, the required restriction can, according to the invention, be established in the filtrate outlet 15 by means of some appropriate means. As shown in FIG. 3, this means consists of a valve 23, which throttles the filtrate outlet 15 when no other restriction exists and opens when a filter cake is formed on the filter. E.g. a signal from the load on the outfeed screw 17 can provide impulse for closing or opening the valve 23, so that, when there is no filter cake on the filter and the outfeed screw 17 runs unloaded, the valve 23 closes to preset position and opens again when a filter cake has been formed and the outfeed screw has become loaded. This is illustrated in FIG. 3. In FIG. 4 another embodiment for governing the valve 23 is shown. There, valve 23 is governed by impulses from a transmiter 24, which measures the difference pressure over the filtrating zones existing in gaseous phase, so that valve 23 is closed to a position for creating a higher difference pressure over the zones when the difference pressure is lower than a preset value and is opened completely with delay when the difference pressure exceeds a preset value. Another alternative is to govern valve 23 by an impulse from a transmitter measuring the thickness of the filter cake 10 (not shown).

The valve 23 is particularly useful when the suspension level in the vessel for some reason sinks below the shaft 6.

A further alternative is to provide the filtrate outlet 15 with a seprate liquid lock instead of the valve 23. The solutions mentioned above having the valve 23 are, however, preferred in most cases, since then no aditional restriction or resistance loads the blower 20 during normal filtrating and thereby the entire capacity of the blower can be utilized for the filtering operation.

When high dry content of the discharge filter cake is persued, it is necessary to operate the filter such that comparatively thin filter cake 10 and comparatively high difference pressure over the gaseous phase of the filter, i.e. the filtering zone 9 are formed.

Preferably during the filtering operations and particularly in order to form a comparatively thin filter cake 10 at high concentration of the supplied suspension, it is desirable to maintain a lower difference pressure over the liquid phase of the filter, i.e. the filtering zone 8, than over the gaseous phase (and at said high concentration a substantially lower difference pressure is maintained). This can be accomplished by a control valve 25 arranged in the filtrate outlet 14. One way of governing this valve is by means of a level sensor 26 on the filter 1. This level sensor arranged to govern the control valve 25 and the rotation speed of the filter so that the suspension level 19 is kept constant at a preset value, firstly by governing the control valve until it is completely open, whereupon the level sensor begins to govern the velocity of the filter from a preset minimum value and upwards so that the suspension level is kept constant.

By providing the filter with govern and control means as described above it make it simple to govern the difference pressure for each separate filtrating zone 7-9 and the pressure relation between the different filtrating zones. It should be noted that the number of zones is not limited to the three zones described above and shown on the drawings.

The invention has been described above and shown on the drawings in connection with a disc filter. The invention, however, can also relate to a drum filter, i.e. a filter element in the form of a rotating drum with surrounding filter cloth.

I claim:

1. Filter for contiuous filtering of a suspension under pressue, comprising:
   a pressure vessel;
   a rotatable filter element arranged in the pressure vessel, for each revloution said filter element passing a filtering cycle having a plurality of filtering zones in liquid phase and gaseous phase;
   filtrate channels connected between the filter elements and seprate filtrate outlets from the pressure vessel for each filtering zone;
   means in the gaseous phase zone for removing filter cake received during the filtering on the filter elements;
   means for discharging removed filter cake from the pressure vessel;
   means for effecting required difference pressure over the filter elements;
   means for independently controlling the difference pressure over the filter elements in each filtering zone, said control means further being arranged to maintain a lower difference pressure in the liquid phase zone than in the gas phase zone for controlling the difference pressurs over the filter elements in the filtration zones in gas phase and liquid phase independent of each other and wherein a lower difference pressure in the liquid phase zone than in the gas phase zone is maintained.

2. Filter according to claim 1, wherein said control means is connected to said filtrate outlets.

3. Filter according to claim 2, wherein said control means comprises a control valve governed by a transmitter connected to the filter.

4. Filter according to claim 3, wherein said transmitter comprises a measure transmitter connected to said means for discharging the filter cake, said measure transmitter governing the control valve in dependence of the load on said discharging means.

5. Filter according to claim 3, wherein said transmitter comprises a measure transmitter connected to the gas phase zone for measuring the difference pressure at this zone.

6. Filter according to claim 3, wherein said transmitter comprises a measure transmitter for measuring the thickness of the filter cake.

7. Filter according to claim 3, wherein said transmitter comprises a sensor means for sensing the level of the suspension in the pressure vessel.

8. Filter according to claim 2, wherein said control means comprises a liquid lock arranged in the filtrate outlet from the gas phase zone.

* * * * *